A. BURCHARD.
Machine for Pulling Flax.
No. 46,857.
Patented March 14, 1865.
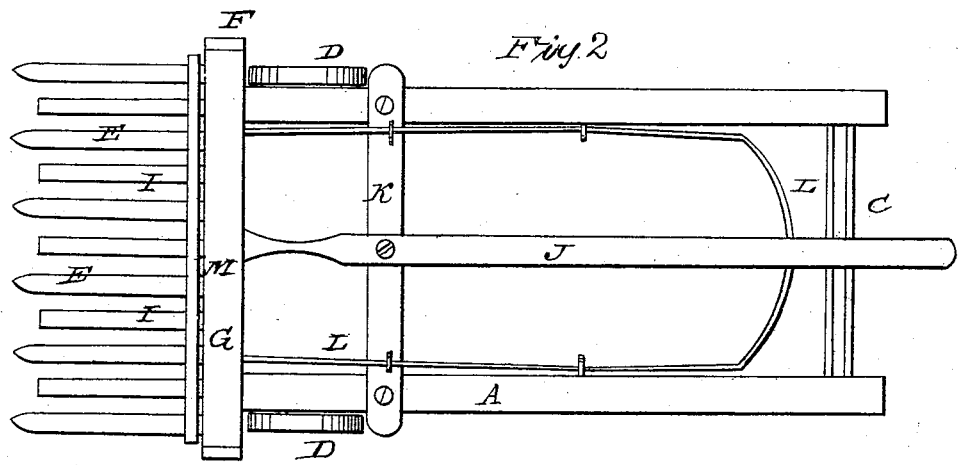
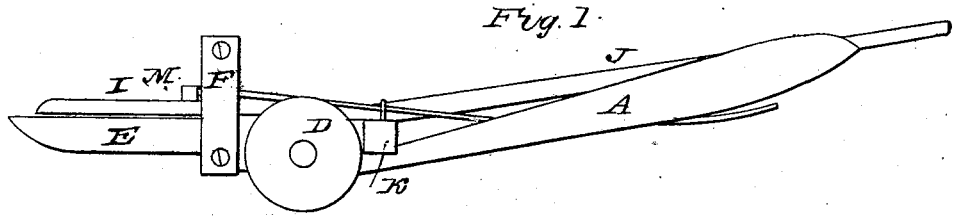
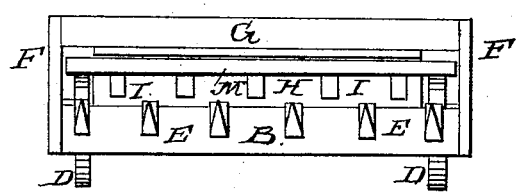
Witnesses
William Miller
Charles Hadaway
Inventor
Anson Burchard
By his Atty S. Dennis Jr.

UNITED STATES PATENT OFFICE.

ANSON BURCHARD, OF LIVINGSTONVILLE, NEW YORK.

MACHINE FOR PULLING FLAX.

Specification forming part of Letters Patent No. 46,857, dated March 14, 1865.

*To all whom it may concern:*

Be it known that I, ANSON BURCHARD, of Livingstonville, Schoharie county, and State of New York, have invented a new, useful, and Improved Machine for Pulling Flax, Hemp, &c.; and I do hereby declare that the following specification, with the accompanying drawings, are sufficient to enable any person skilled in the art or science to which it most nearly appertains to make and use my said invention or improvements without further invention or experiment.

The nature of my invention consists in a frame mounted on wheels, which form a fulcrum for the frame to vibrate on, which frame is armed with a series of stationary teeth, with a series of traversing teeth working right over them, and traversed to clamp the flax or hemp to be pulled, as will be hereinafter described; also, in a traversing frame for removing the flax from the teeth after it is pulled.

In the drawings, Figure 1 is an elevation of one side of the machine. Fig. 2 is a plan or top view, and Fig. 3 an elevation of one end, the same letters indicating like parts in each of the figures.

In these drawings, A A are the side rails, B the front bar, and C the rear bar, the whole being firmly fastened together, forming a strong frame, which is mounted on the wheels D D, as shown in the drawings. The stationary teeth E E are firmly fastened in the front bar, B. These teeth are made in the form shown, or in such other form as will answer the purpose, and pointed, so as to enter standing flax or hemp readily.

There is a stand, F, fastened to each end of the bar B to support the top bar, G. There is a rib on the top of the bar B, and a groove in the under side of the bar G, and the carriage H is fitted to the rib and groove, so as to traverse fully between the bars B and G. This carriage H has the clamping-teeth I I fastened in it, which are shown half-way between the others, and are traversed either way by the carriage, which has a mortise in it for the end of the lever J which traverses it. The fulcrum of this lever is a screw in the bar K, fastened on the top of the rails A A, as shown in the drawings. The rear end of the lever J extends back to the rear of the frame for the convenience of the operator in working it. There are some scores in the ends of the carriage H, so that it can traverse on the U-shaped frame L L, which traverses in staples in the bar K and rails A A and moves the clearing-bar M, which is fastened to it, (the U-shaped frame,) and the use of the clearing-bar is to push the flax from between the teeth after it is pulled.

This machine is operated as follows: The laborer seizes the rear end of the frame, draws back the clearing-bar, and moves the lever J to the left to bring the clamping-teeth right over the stationary teeth, and then pushes the machine forward, forcing the teeth in among the standing flax, at the same time holding up the rear of the machine, so that the teeth enter the flax near the ground. When the teeth have been pushed into the flax up to the bar B, the clamping-teeth are moved to the left by the lever J to clamp the stalks of flax, and the rear end of the frame depressed to pull up the flax, when the machine may be pulled back a little and the clamping-teeth moved to the right to release the flax pulled, which is pushed out from between the teeth by pushing forward the clearing-bar.

From the foregoing description it is apparent that when the rear end of the frame is depressed the wheels form the fulcrum for the frame, which is the lever that pulls the flax.

I claim—

1. A frame mounted on wheels which form a fulcrum for the frame to vibrate on, which frame is armed with a series of stationary teeth, in combination with a series of traversing teeth, arranged to operate substantially as described, for the purpose set forth.

2. In combination with the devices above claimed, the clearing-bar for removing the flax from between the teeth after it is pulled.

ANSON BURCHARD.

Witnesses:
GEORGE LEACH,
JAS. S. FRENCH.